United States Patent Office 3,530,161
Patented Sept. 22, 1970

3,530,161
AROMATIC ISOTHIOCYANATE PRODUCTION
Colin G. Hull, Berkeley, Calif., assignor to Shell Oil Company, New York, N.Y., a corporation of Delaware
No Drawing. Filed Aug. 19, 1968, Ser. No. 753,734
Int. Cl. C07c 161/04
U.S. Cl. 260—454      8 Claims

ABSTRACT OF THE DISCLOSURE

Aromatic isothiocyanates are produced by contacting aromatic nitro compounds with carbon monoxide and carbon disulfide in the presence of zero-valent iron or cobalt carbonyl complexes.

BACKGROUND OF THE INVENTION

It is known that aromatic isothiocyanates can be prepared from aromatic nitro compounds by a two-step process which comprises (1) reducing the nitro compound to the corresponding amine and (2) contacting the amine with carbon disulfide as disclosed, for example, in U.S. 2,263,386 of Hester, issued Nov. 18, 1941. It would be of advantage, however, to prepare aromatic isothiocyanates in a one-step process directly from aromatic nitro compounds without prior or separate reduction to the corresponding amine.

SUMMARY OF THE INVENTION

It has now been found that aromatic isothiocyanates can be prepared by contacting aromatic nitro compounds with carbon monoxide and carbon disulfide in the presence of a zero-valent iron or cobalt carbonyl complex.

DESCRIPTION OF PREFERRED EMBODIMENTS

Aromatic nitro compound

The process of the invention is generally applicable to any aromatic nitro compound in which each nitro group is attached to an aromatic carbon atom, i.e., a carbon atom which is a member of a six-membered carbocyclic aromatic ring. The aromatic nitro compound is monocyclic or polycyclic of up to four fused or separate aromatic rings, preferably of from one to two aromatic rings, has from 6 to 30 carbon atoms, preferably from 6 to 15 carbon atoms, and has from one to four nitro groups, preferably from one to three nitro groups, which comprises the only nitro groups present within the molecule. The aromatic nitro compounds are hydrocarbon aromatic nitro compounds containing only carbon and hydrogen other than the nitrogen and oxygen atoms of the nitro group or are substituted-hydrocarbon aromatic nitro compounds additionally containing non-interfering substituents such as halogens of atomic number from 9 to 53 inclusive, i.e., fluorine, chlorine, bromine and iodine, or atoms of oxygen and sulfur incorporated in non-interfering functional groups such as alkoxy, aryloxy, alkaryloxy, carbalkoxy, alkylthio and arylthio.

One class of such suitable aromatic nitro compounds is represented by Formula I

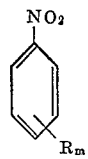

(I)

wherein $m$ is a whole number from 0 to 4 inclusive and represents the number of R groups attached to the aromatic ring and R independently is nitro; hydrocarbyl of up to 10 carbon atoms; halogen of atomic number from 9 to 53 inclusive, preferably of atomic number from 17 to 35 inclusive, e.g., chlorine and bromine; alkoxy of up to 6 carbon atoms, e.g., methoxy, ethoxy, propoxy and butoxy; aryloxy or alkaryloxy of up to 10 carbon atoms, e.g., phenoxy, naphthoxy, and p-methylphenoxy; aralkoxy of up to 10 carbon atoms, such as benzyloxy; alkylthio of up to 6 carbon atoms such as methylthio and ethylthio; or arylthio of up to 10 carbon atoms such as phenylthio and p-methylphenylthio. Hydrocarbyl R groups are preferably free from aliphatic unsaturation and include alkyl such as methyl, ethyl, propyl, pentyl and hexyl, cycloalkyl such as cyclopentyl and cyclohexyl; aralkyl such as benzyl and phenylethyl; and aryl and alkaryl such as phenyl, tolyl and xylyl. The R groups of Formula I may all be the same, or may be in part or wholly different.

Exemplary aromatic nitro compounds of Formula I are nitrobenzene, 1,2-dinitrobenzene, 1,3-dinitrobenzene, 1,4-dinitrobenzene, 1,2,4 - trinitrobenzene, 1,3,5 - trinitrobenzene, 1-methyl-2-nitrobenzene, 1-ethyl-3-nitrobenzene, 1-propyl-4-nitrobenzene, 1,2-dimethyl-3-nitrobenzene, 1-cycloheptyl-4-nitrobenzene, 1-phenyl-3-nitrobenzene, 1-(1-phenylethyl)-4-nitrobenzene, 1-chloro-2-nitrobenzene, 1-bromo-3-nitrobenzene, 1-chloro-2-methyl-4-nitrobenzene, 1-bromo-3-phenyl-4-nitrobenzene, 1-methoxy-4-nitrobenzene, 1-phenoxy-4-nitrobenzene, 1-benzyloxy-3-nitrobenzene, 1-methoxy-2-methyl-4-nitro-5-chlorobenzene, 1-ethylthio-3-nitrobenzene, 1-phenylthio-4-nitrobenzene, 1-chloro-2-methoxy-4-methylthio-5-nitrobenzene, and 1-phenoxy-3-chloro-4-nitrobenzene and 1-ethylthio-2,4-dinitrobenzene.

Other suitable aromatic nitro compounds include polycyclic aromatic nitro compounds such as bicyclic naphthyl nitro compounds, e.g., 1-nitronaphthalene, 1-chloro-4-nitronaphthalene, 1,3-dinitronaphthalene, 1,5-dinitronaphthalene, 1,8-dinitronaphthalene, 1,3,5-trinitronaphthalene, and 1,3,6,8-tetranitronaphthalene and tricyclic nitro compounds, e.g., 9-nitroanthracene, 2-nitrophenanthrene and 2,7-dinitrophenanthrene.

Aromatic nitro compounds of Formula I having one to two nitro groups and having R groups selected from nitro, halogens and alkyl are preferably employed in the process of the invention.

The catalyst

Although it is not desired to be bound by any particular theory, it appears that the chemical transformations during the course of the reaction which involves the catalyst are quite complex and no one single structure adequately describes the actual catalyst species. However, it is believed that the actual catalytic species is an iron or cobalt carbonyl complex associated with carbon disulfide or a sulfur species derived from carbon disulfide. Cobalt carbonyl complexes are known to undergo complex chemical transformations in the presence of carbon disulfide. For example, Klumpp et al., J. Organometal. Chem. 11, 207 (1968) disclose that the reaction of dicobalt octacarbonyl and carbon disulfide produces a variety of sulfur-containing cobalt carbonyl complexes such as $Co_4(CO)_{10}CS_2$, $[Co_2(CO)_5S]_2$, $Co_3(CO)_9S$, $Co_3(CO)_6CS_2$ and $Co_3(CO)_6(S)(CS)$.

Generically the catalyst as provided to the reaction mixture comprises a zero-valent iron or cobalt carbonyl complex. Broadly speaking, any iron or cobalt carboxyl complexes which contain only carbon monoxide as the complexing ligands or additionally contain other organic complexing ligands such as olefins, diolefins, organophosphines, organoarsines and organostibines are operable as the catalyst. One class of such carbonyl complexes are iron carbonyl complexes of the formulas $Fe(CO)_5$, $Fe_2(CO)_9$, $Fe_3(CO)_{12}$ and $$(R'_3P)_xFe(CO)_{5-x} \qquad (II)$$

wherein R' is an organic group of up to 20 carbon atoms, preferably to up to 10 carbon atoms, and is attached to phosphorus by carbon-phosphorus bonds, i.e. R'$_3$P is a tris-organophosphine, and $x$ is a whole number from 1 to 4 inclusive. The organic group R' is suitably hydrocarbon aromatic containing only atoms of carbon and hydrogen or is substituted-hydrocarbon aromatic additionally containing atoms of halogens of atomic number from 9 to 53 inclusive as substituents on aromatic ring carbon atoms or atoms of oxygen incorporated in functional groups such as alkoxy, aryloxy or carbalkoxy. Illustrative hydrocarbon aromatic R groups are aryl or alkaryl of 1 to 2 fused or separate 6-carbon rings, such as phenyl, naphthyl, p-phenylphenyl, tolyl, xylyl, p-ethylphenyl, 2,4-dipropylphenyl, 4-tert-butylnaphthyl, m-laurylphenyl, 2,4,6-trimethylphenyl and 3,5-dihexylphenyl. Other suitable R groups are alkyl of up to 12 carbon atoms, as illustrated by methyl, ethyl, propyl, isopropyl, butyl, tert-butyl, pentyl, hexyl, heptyl, nonyl, decyl and dodecyl; cycloalkyl such as cyclohexyl, cycloheptyl, methylcyclohexyl and 3,3,5-trimethylcyclohexyl; alkenyl such as ethenyl, propenyl, butenyl, pentenyl and like radicals; and cycloalkenyl radicals such as 2,3,4-trimethylcyclopentenyl and cyclohexenyl.

Examples of suitable tris-organo phosphines represented by R'$_3$P, including trialkylphosphines, triarylphosphines and mixed aryl alkyl phosphines, are trimethyl phosphine, triethylphosphine, dipropylhexylphosphine tri-n-butylphosphine, trihexylphosphine, triphenylphosphine, tritolylphosphine, naphthyldiphenylphosphine, tris(p-chlorophenyl) phosphine, di-n-propylphenylphosphine and diphenylhexylphosphine.

The tris-organophosphine ligand of Formula II may all be the same, or may be in part or wholly different. Examples of iron carbonyl complexes of Formula II therefore include triphenylphosphinetetracarbonyliron(O),
tributylphosphinetetracarbonyliron(O),
bis(triethylphosphine)tricarbonyliron(O),
trimethylphosphinetritolylphosphinetricarbonyliron(O),
bis(tricyclohexylphosphine)tricarbonyliron(O),
tris(ethyldiphenylphosphine)dicarbonyliron(O),
tris(tributylphosphine)dicarbonyliron(O),
bis(dipropylphenylphosphine)bis(triphenylphosphine) carbonyliron(O),
tetra-(tri-p-phenoxyphenylphosphine)carbonyliron(O).

Other suitable carbonyl complexes include cobalt carbonyl complexes represented by the Formula III

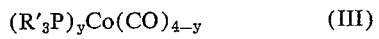

(R'$_3$P)$_y$Co(CO)$_{4-y}$     (III)

wherein R' has the previously stated significance and $y$ is whole number from 0 to 3 inclusive. Cobalt carbonyl complexes of Formula III therefore include tetracarbonylcobalt(O),
triphenylphosphinetricarbonylcobalt(O),
tributylphosphinetricarbonylcobalt(O),
triethylphosphinetricarbonylcobalt(O),
trihexylphosphinetricarbonylcobalt(O),
diphenylethylphosphinetricarbonylcobalt(O),
bis(tricyclohexylphosphine)dicarbonylcobalt(O),
bis(tri-m-bromophenylphosphine)dicarbonylcobalt(O), and
tris-(tri-p-methoxyphenylphosphine)carbonylcobalt(O).

For convenience, the cobalt carbonyl complexes of Formula III are represented as the monomeric species. It should be appreciated, however, that some cobalt carbonyl complexes of Formula III are known to exist under certain conditions as a dimeric species, e.g., cobalt tetracarbonyl frequently occurs as dicobalt octacarbonyl.

Preferred catalyst of the process of the invention are cobalt and iron complexes containing carbon monoxide as the only complexing ligand, especially Co(CO)$_4$ and Fe$_3$(CO)$_{12}$.

The iron or cobalt complex is employed in catalytic quantities, i.e., amounts which are minor relative to the aromatic nitro compound. Catalyst concentrations from about 0.0001% mole to about 10% mole based on aromatic nitro compound are satisfactory with concentrations from about .1% mole to about 5% mole on the same basis being preferred.

Other reaction mixture components

The process of the invention comprises contacting the aromatic nitro compounds with carbon monoxide and carbon disulfide in the presence of the iron or cobalt catalyst. Commercially available grades of carbon monoxide and carbon disulfide of reasonable purity are usually satisfactory. Both the carbon monoxide and carbon disulfide are generally provided in amounts in excess of the amount of aromatic nitro reactant. In general, molar ratios of carbon monoxide to aromatic nitro reactant vary from about 3:1 to about 100:1 and molar ratios of carbon disulfide to aromatic nitro reactant vary from about 1:1 to about 50:1, preferably from about 2:1 to about 20:1. The carbon monoxide is generally provided at initial pressures of from about 10 atmospheres to about 100 atmospheres.

The reaction conditions

The process of the invention is conducted by any of a variety of procedures. In one modification, the aromatic nitro reactant, catalyst, carbon monoxide and carbon disulfide are charged to an autoclave or similar pressure reactor for opeartions in a batchwise manner. In another modification, reaction is effected in a continuous operation as by contacting the entire reaction mixture during passage through a tubular reactor. In any modification, the reaction is conducted at elevated temperatures and pressures. Suitable reaction temperatures vary from about 100° C. to about 300° C. with best results being obtained through utilization of temperatures from about 150° to about 250° C. Although the initial carbon monoxide pressures described above will decrease with reaction time, the total reaction pressures remain sufficient to maintain a substatnial portion of the reaction components in the liquid phase.

Subsequent to reaction, the reaction mixture is separated by conventional means such as fractional distillation, selective extraction, gas-liquid chromatography and the like.

The aromatic isothiocyanate products have established utility in a variety of applications. Certain aromatic isothiocyanates suitably prepared by the process of the invention possess insecticidal activity as discolsed by U.S. Pat. No. 2,263,386 of Hester. The aromatic isothiocyanates undergo many of the reactions of the corresponding isocyanates, for example, isothiocyanates react with amines to form substituted thioureas as disclosed by Methoden der Organischen Chemi, 9, 878 (1955). U.S. Pat. No. 2,257,-162 of Esselmann et al., issued Sept. 30, 1942 discloses the preparation of useful acid and alkali stable synthetic resins by the reaction of aryl isothiocyanates and alkylene imine, e.g. 2-chloro-4-isothiocyanotoluene and ethyleneimine.

To further illustrate the improved process of the invention, the following examples are provided. It should be understood that the details thereof are not to be regarded as limitations, as they may be varied as will be understood by one skilled in this art.

Examples I–XIV.—A series of runs employing a variety of aromatic nitro compounds, carbon monoxide and carbon disulfide in the presence of several representative iron and cobalt carbonyl complexes was conducted by charging the entire amounts of reaction components to a 80 ml. autoclave. Each run was conducted with 1 g. of the indicated catalyst, 5 g. of the indicated nitro compound and 30 g. of carbon disulfide, at an initial carbon monoxide pressure of 800 p.s.i.g., and for a reaction period of 15 hours. The aromatic nitro compound employed, the reaction conditions and the results obtained are provided in Table I. The 2-chloro - 4 - isothiocyantoluene product of Example XII is believed to be novel, had a boiling point of 145–146° C. at 16 mm. of Hg and gave the following elemental analysis:

Calc'd. (percent wt.): C, 52.3; H, 3.3; S, 17.4; Cl, 19.4.
Found (percent wt.): C, 52.0; H, 2.7; S, 17.1; Cl, 19.0.

wherein $m$ is a whole number of from 0 to 4 inclusive and R independently is nitro alkyl, cycloalkyl, aralkyl, aryl or alkaryl of up to 10 carbon atoms, chlorine, bromine, alkoxy of up to 6 carbon atoms, aryloxy or alkaryloxy of up to 10 carbon atoms, aralkoxy of up to 10 carbon atoms, alkylthio of up to 6 carbon atoms or arylthio of up to 10 carbon atoms.

TABLE 1

| Example | Nitro compound | Catalyst | Temp., °C. | Conversion of nitro compound, percent | Isothiocyanate product (selectivity, percent) |
|---|---|---|---|---|---|
| I | Nitrobenzene | $Fe_3(CO)_{12}$ | 200 | 93 | Phenylisothiocyanate (83). |
| II | Nitrobenzene | $Co(CO)_3P(C_4H_9)_3$ | 200 | 41 | Phenylisothiocyanate (82). |
| III | Nitrobenzene | $Co(CO)_4$ | 205 | 100 | Phenylisothiocyanate (70). |
| IV | 1,4-dinitrobenzene | $Co(CO)_4$ | 205 | 100 | 1,4-diisothiocyanobenzene (45). |
| V | 1-chloro-2-nitrobenzene | $Co(CO)_4$ | 205 | 100 | 1-chloro-2-isothiocyanobenzene (51). |
| VI | 1-chloro-4-nitrobenzene | $Co(CO)_4$ | 200 | 78.5 | 1-chloro-4-isothiocyanobenzene (62). |
| VII | o-Nitrotoluene | $Co(CO)_4$ | 200 | 80 | o-Isothiocyanotoluene (80). |
| VIII | m-Nitrotoluene | $Co(CO)_4$ | 200 | 93 | m-Isothiocyanotoluene (62). |
| IX | p-Nitrotoluene | $Co(CO)_4$ | 200 | 85 | p-Isothiocyanotoluene (62). |
| X | 2,4-dinitrotoluene | $Co(CO)_4$ | 200 | 100 | 2,4-diisothiocyanotoluene (53.5). |
| XI | 2,6-dinitrotoluene | $Co(CO)_4$ | 241 | 100 | 2,6-diisothiocyanotoluene (19.5). |
| XII | 2-chloro-4-nitrotoluene | $Co(CO)_4$ | 200 | 100 | 2-chloro-4-isothiocyanotoluene (62). |
| XIII | 4-chloro-2-nitrotoluene | $Co(CO)_4$ | 198 | 59.5 | 4-chloro-2-isothiocyanotoluene (42). |
| XIV | 2-chloro-6-nitrotoluene | $Co(CO)_4$ | 200 | 100 | 2-chloro-4-isothiocyanotoluene (63.5). |

I claim as my invention:

1. A process of producing carbocyclic aromatic isothiocyanate compounds by initimately contacting in liquid phase carbocyclic aromatic nitro compounds having from 6 to 30 carbon atoms, having from 1 to 4 nitro groups attached to aromatic carbon atoms, having from 1 to 4 aromatic rings and additionally containing up to 4 substituents selected from fluorine, chlorine, bromine, iodine, alkoxy, aryloxy, alkaryloxy, carbalkoxy, alkylthio and arylthio, with carbon monoxide and carbon disulfide, wherein the molar ratio of carbon monoxide to aromatic nitro compound is from 3:1 to about 100:1 and the molar ratio of carbon disulfide to aromatic nitro compound is from about 1:1 to about 50:1 in the presence of a zero-valent iron or cobalt carbonyl complex as catalyst, said catalyst being selected from $Fe(CO)_5$, $Fe_2(CO)_9$, $Fe(CO)_{12}$, $(R'_3P)_xFe(CO)_{5-x}$ and $(R'_3P)_yCo(CO)_{4-y}$ wherein R' has up to 20 carbon atoms and is selected from aryl, alkaryl, alkyl, cycloalkyl, alkenyl, cycloalkenyl and alkoxy-, aryloxy- or carbalkoxy-substituted aryl, alkaryl, cycloalkyl, alkenyl and cycloalkenyl, $x$ is a whole number of from 1 to 4 inclusive, at a temperature of from about 100° C. to about 300° C. and at a carbon monoxide pressure of from about 10 atmospheres to about 100 atmospheres.

2. The process of claim 1 wherein the aromatic nitro compound has from one to three nitro groups and is represented by the formula

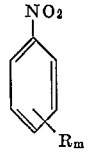

3. The process of claim 2 wherein the R groups of the aromatic nitro compound are selected from chlorine, bromine, alkyl, cycloalkyl, aralkyl, aryl and alkaryl.

4. The process of claim 3 wherein the catalyst is cobalt tetracarbonyl.

5. The process of claim 3 wherein the catalyst is $Fe_3(CO)_{12}$.

6. The process of claim 3 wherein the aromatic nitro compound is 2,4-dinitrotoluene.

7. The process of claim 3 wherein the aromatic nitro compound is 2,6-dinitrotoluene.

8. The process of claim 3 wherein the nitro compound is 2-chloro-4-nitrotoluene.

References Cited
UNITED STATES PATENTS

| 2,263,386 | 11/1941 | Hester | 260—454 |
| 2,681,358 | 6/1954 | Wirth | 260—454 |
| 3,070,618 | 12/1962 | Drummond | 260—453 |
| 3,139,449 | 6/1964 | Arahjian | 260—454 |
| 3,290,377 | 12/1966 | Appel | 260—580 |
| 3,293,295 | 12/1966 | Swakon et al. | 260—689 XR |
| 3,405,156 | 10/1968 | Stern et al. | 260—453 |

LEWIS GOTTS, Primary Examiner

G. HOLLRAH, Assistant Examiner

U.S. Cl. X.R.

23—315; 252—431, 439; 260—439